United States Patent Office 3,837,952
Patented Sept. 24, 1974

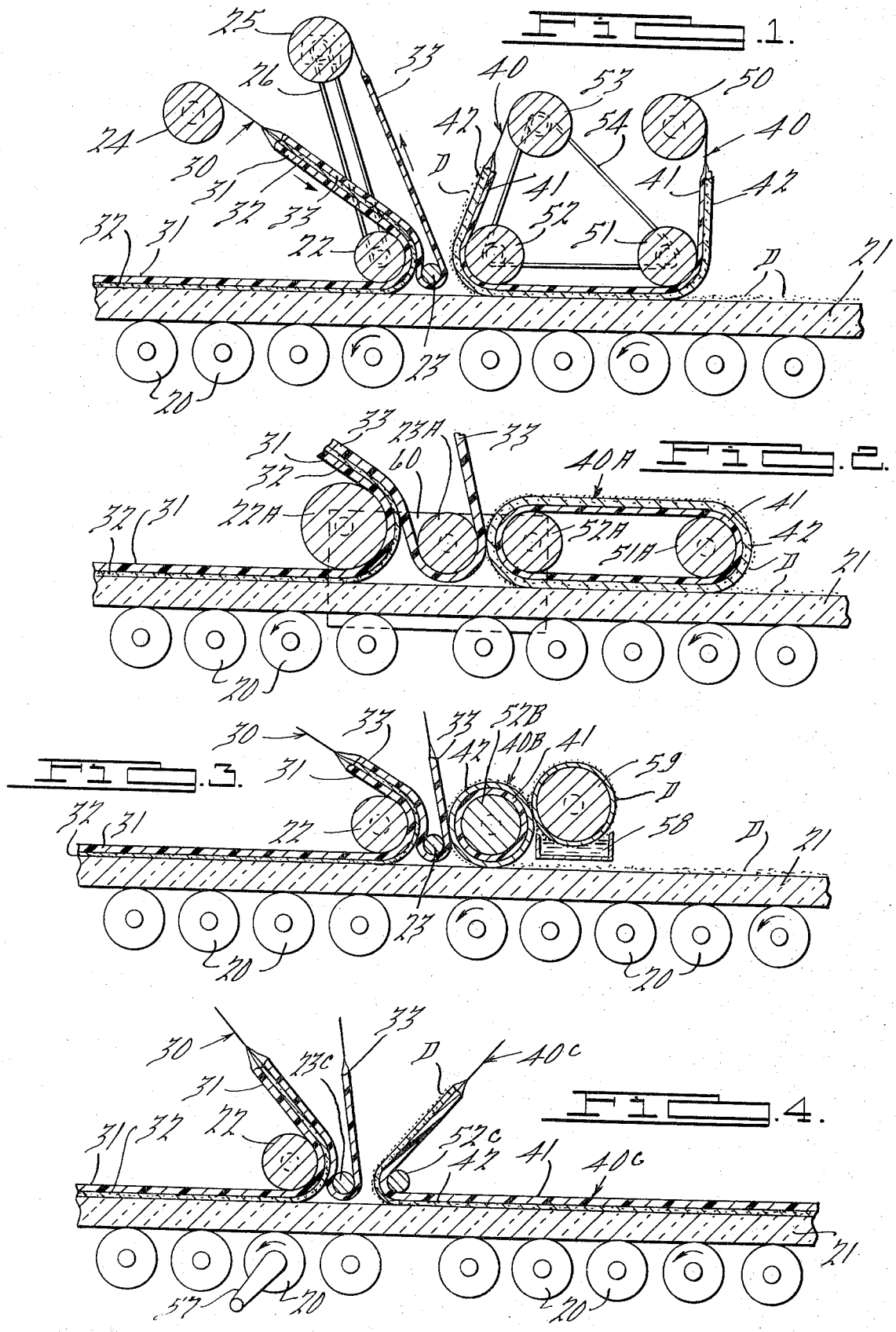

3,837,952
PROCESS AND APPARATUS FOR FORMING A
GLASS AND FILM LAMINATE
Edmund C. Mogford, 4287 Merwin Road,
Lapeer, Mich. 48446
Continuation-in-part of application Ser. No. 345,643,
Mar. 28, 1973. This application May 29, 1973, Ser.
No. 364,928
Int. Cl. B32b 17/06, 17/10
U.S. Cl. 156—99                                 3 Claims

ABSTRACT OF THE DISCLOSURE

Process and apparatus for laminating an adhesive coated laminate sheet having a removable protective sheet on a glass sheet with dust particles therebetween at a low commercially acceptable level, comprising, applying an adhesive coated dust particle collecting member to the glass sheet to adhere dust particles from the glass sheet to the adhesive coated member; removing the adhesive coated dust particle collecting member from the glass sheet with the dust particles previously on the glass sheet adhered to the adhesive coated dust particle collecting member; stripping the removable protective sheet from an adhesive coated laminate sheet adjacent the glass sheet and adjacent the removal of the adhesive coated dust particle collecting member from the glass sheet; and immediately applying the adhesive coated laminate sheet to the glass sheet.

BACKGROUND OF THE INVENTION

Due to the entrapment of dust particles between a flexible sheet, such as a synthetic resin film or plastic sheet having an adhesive coating layer and a glass sheet, the use of laminated glass and plastic sheets as protective and decorative combinations has been limited by the only commercially used method of lamination without objectionable quantities of dust particles known as the "wet method." In the "wet method" after the glass is washed in a glass washing machine, the glass sheet is put on a table immediately and hosed down with water to wash away the dust particles picked up during the transfer from the washing machine. While the hosing is going on, an adhesive coated plastic sheet is superposed on the water layer on the glass sheet. Water is then applied to the exposed surface of the plastic sheet. Then workmen with squeegees work the exposed surface of the plastic sheet to squeeze the water layer together with air bubbles and dust particles from between the plastic sheet and the glass and to bring the wet adhesive layer of the plastic sheet into contact with the glass. Each "wet" glass and plastic sheet laminate then is dried individually and separately for about twenty-four hours to let residual water and the wet adhesive layer dry out through the plastic sheet. Until this wetness is dried out, the adhesive layer does not bond to the glass and the combined sheets cannot be handled and only after the drying can the plastic-sheet glass-sheet laminate be used. The wet process is expensive in time, material, labor, and drying space. It is also objectionable because the water and squeegeeing creates problems with adjacent operations in a plant. Processes other than the wet method have been tried but without success because they entrap an objectionable quantity of dust particles which customers, architects, builders, etc., will not accept. These dust particles accumulate in a very short time even in a plant where dust is at a minimum.

SUMMARY OF THE INVENTION

The invention comprises a process and apparatus for laminating an adhesive coated laminate sheet having a removable protective sheet on a glass sheet with dust particles therebetween at a low commercial acceptable level as will be understood more fully from the detailed description in conjunction with the drawing and also the following description.

The process and apparatus for laminating an adhesive coated laminate sheet having a removable protective sheet on a glass sheet comprises applying an adhesive coated dust article collecting member to the glass sheet to adhere dust particles from the glass sheet to the adhesive coated member; removing the adhesive coated dust particle collecting member from the glass sheet with the dust particles previously on the glass sheet adhered to the adhesive coated dust particle collecting member; stripping the removable protective sheet from the adhesive coated laminate sheet adjacent the glass sheet and adjacent the removal of the adhesive coated dust particle collecting member from the glass sheet, and immediately applying the adhesive coated laminate sheet to the glass sheet.

DESCRIPTION OF THE DRAWING

FIG. 1 is a schematic illustration of an embodiment of the apparatus for performing the process showing the conveyor in diagrammatic circles, a glass sheet in cross-section, various adhesive sheet handling rollers in cross-section, drives in broken lines, and showing the adhesive coated plastic sheets in greatly enlarged cross-section at the rollers for purposes of clear illustration.

FIG. 2 is a view similar to FIG. 1, showing the dust collecting member as an endless belt.

FIG. 3 is a view similar to FIGS. 1 and 2 showing the dust collector member as a roller together with an optional adhesive applying roller running against the dust collector member; and FIG. 4 is a view similar to FIGS. 1, 2 and 3, showing the dust collector member as a sheet previously applied to the glass.

DETAILED DESCRIPTION OF THE ILLUSTRATED EMBODIMENTS

A conveyor has a plurality of rolls 20. One or more of the rolls 20 are driven. The conveyor provides a flat traveling bed, FIG. 1. A glass sheet 21 lies on the rolls 20. An applicator roller 22 lies above the glass sheet 21. A protective sheet remover bar, slide or roller 23 lies adjacent the applicator roller 22 and the glass sheet 21. A laminate supply roll 24 and a protective sheet take-up roll 25 are located to coact with the applicator roller 22 and the remover roller 23 respectively. A drive 26 leads between the applicator roller 22 and the take-up roll 25 and is applied to the take-up roll 25 via a friction-slip clutch to allow for difference in peripheral surface speed. A friction-slip brake holds back on the supply roll 24. The three-ply laminate 30 on the supply roll 24 has a plastic film or sheet 31, an adhesive layer 32 on the sheet 31, and a removable protective sheet 33 on the adhesive layer 32. The three-ply laminate 30 leads from the supply roll 24 under tension from the brake to the applicator roller 22 and the remover roller 23. Here the protective sheet 33 is turned around the remover roller 23 and led back to the take-up roll 25. Here the film layer 31 and adhesive layer 32 lead around the applicator roller 23 and come into contact with the glass sheet 21 with the adhesive layer 32 against the glass sheet 21. The applicator roller 22 and the conveyor rolls 20 are adjustably spaced to effect pressed engagement of the glass sheet 21 to the adhesive layer 32 and sheet 31 by compressing them against one another. It will be understood that travel of the glass sheet 21 by the driven conveyor rolls 20 turns the applicator roll 22, pulls the laminate 30 off the supply roll 24 under tension, aplies the adhesive layer 32 and plastic sheet 31 to the glass sheet 21, and that the friction-slip clutch over-drive 26 to take-up roll 25 removes the protective sheet 33 from the laminate 30.

A dust collector member 40 has a backing sheet 41 and an adhesive layer 42. The dust collector member 40 is adhered to the glass sheet 21. This is done prior to the glass sheet 21 advancing to the location of the remover roller 23. In the apparatus of FIG. 1, a friction-braked feed roll 50 plays out the dust collector member 40 wound thereon under tension to a first pressure roller 51 which forces the dust collector member 40 and adhesive layer 42 against the glass sheet 21. A second pressure-remover roller 52 lies adjacent the protective sheet remover roller 23. The dust collector member 40 turns around the pressure-remover roller 52 and is removed thereby from the glass sheet 21 with the dust particles just prior to the protective sheet remover roller 23. A storage roller 53 lies adjacent the roller 52. The dust collector member 40 leads from the roller 52 to the storage roller 53. An over-drive 54 is connected to the storage roller 53 via a friction-slip clutch from both rollers 51 and 52 to provide for difference in peripheral speed. Drive to the rollers 51 and 52 is provided by the adhesion of the dust collector member to the glass sheet as it moves past the rollers 51 and 52 in conjunction with the frictional engagement of the backing sheet 41 with the rollers 51 and 52. The drive between the rollers 51 and 52 provides drive of roller 52 and storage roller 53 upon a glass sheet 21 entering the position of roller 51.

In the apparatus of FIG. 2, the dust collector member 41A is disposed as an endless belt around the rollers 51A and 52A. This provides a drive between the rollers 51A and 52A while at the same time applying the adhesive layer 42 to the glass sheet 21 and removing it from the glass sheet with the dust particles D at the remover roller 23A. The protective sheet 33 as it is removed from the three-ply laminate 30 is closed against the dust collector member 40A. As the protective sheet 33 and the dust collector member 40A travel at the same surface speed, their juncture provides a top closure over the glass sheet 21 from where the glass sheet 21 leaves the dust collector member 40A to where it is joined by the plastic sheet 31 at the applicator roller 22A. A dust shield 60 at either end of this area of the glass sheet provides a closure thereat thus providing a closed chamber for the glass in its momentarily uncovered condition.

Referring now to the apparatus of FIG. 3, the dust collector member 40B is in the form of a cylinder on the roller 52B. The dust collector member 52B applies its adhesive coating 42 to the glass sheet 21 collecting the dust particles on the glass sheet 21 and then removes its adhesive coating 42 with the dust particles D from the glass sheet 21. Optionally, an adhesive coating renewal roller 59, having a supply of adhesive on it, such as supplied by a tray 58, rides against the dust collector member 59 and keeps the adhesive layer 42 tacky to absorb dust particles on the glass sheet 21.

The embodiment of FIG. 4 has a dust collector member 40C having a backing sheet 41 and an adhesive layer 42. The member 40C is applied to the glass sheet 21 in an operation which may be separate from the operation which applies the laminate sheet 31 to the glass sheet 21. This allows the user to store glass sheets 21 with a dust collector member 40C thereon so as to have a supply on hand. The apparatus of FIG. 4 has a slide bar 52C for leading the dust collector member 40C thereover to separate it from the glass sheet 21. A protective sheet 33 and remover slide bar 23C lie adjacent the slide bar 52C and the applicator roller 22. A hand crank 57 may drive a conveyor roller 20 as shown or the applicator roller 22 as desired to move the glass on the conveyor rollers 20 past the applicator roller 22. One or more workmen may turn the crank 57 and tension the member 40C, the protective sheet 33, and the three-ply laminate 30 to remove the dust collector member 40C from the glass sheet 21 with the dust particles D, to separate the protective sheet 33 from the three-ply laminate 30, and to apply the laminate sheet 31 to the glass sheet 21 via the adhesive layer 32 on the laminate sheet 31.

It will be understood that disclosed embodiments of the apparatus may be motor powered, hand powered, and/or a combination thereof to drive the rollers and rolls and to torque and tension the rolls in playing out material to laminate glass sheets with adhesive coated film, paper, and/or plastic laminate sheets as desired by a user and/or to suit the needs of operators, installers, plants, etc.

In all apparatus embodiments illustrated, the dust collector member 40 is applied or has been applied to the glass sheet 21 and collects the dust particles D from the glass 20 on the adhesive layer 42 of the dust collector member 40. The dust collector member and adhered dust particles D are removed from the glass sheet 21 just prior to the application of the laminate sheet 31 so that the laminate glass sheet 21 and laminate sheet 31 have dramatically reduced and substantially eliminated entrapped dust particles D between them.

The novel "dry" process of applying a dust collector member to the glass sheet, adhering the dust particles D which were on the glass sheet to the adhesive layer of the dust collector member, and removing the dust collector member together with the dust particles D just prior to application of the laminate sheet provides a glass and plastic laminate of low incidence of entrapped dust particles D so as to be commercially acceptable and desirable and thus fulfills a long-felt want in the art and a commercially acceptable lower cost product obviating the "wet method" which has been the only known commercial method of producing an acceptable product in the trade.

The protective scope of the invention is defined in the appended claims.

I claim:

1. A process for laminating an adhesive coated laminate sheet having a removable protective sheet on a glass sheet with entrapped dust particles therebetween at a low commercially acceptable level comprising,
    applying an adhesive coated dust particle collecting member to the glass sheet to adhere dust particles from the glass sheet to the adhesive coated member,
    removing the adhesive coated dust particle collecting member from the glass sheet with the dust particles previously on the glass sheet adhered to the adhesive coated dust particle collecting member,
    stripping the removable protective sheet from the adhesive coated laminate sheet adjacent the glass sheet and adjacent the removal of the adhesive coated dust particle collecting member from the glass sheet, and
    immediately applying the adhesive coated laminate sheet to the glass sheet.

2. An apparatus for applying an adhesive coated laminate sheet having a removable protective sheet to a glass sheet with dust particles between the glass sheet and the applied laminate sheet at a low commercially acceptable level and wherein an adhesive coated dust collector member has been previously applied to the glass sheet, comprising,
    a roller conveyor fo rtraveling a glass sheet,
    an applicator roller above said conveyor,
    said conveyor and said applicator roller being spaced to press-engage a glass sheet and a laminate sheet therebetween;
    a protective sheet remover means adjacent said applicating roller,
    a dust collector member remover means adjacent said protective sheet remover means, and
    means for driving one said coveyor and said applicating roller to travel a glass sheet having a previously applied dust collector member on said conveyor,
    first past said adhesive coated dust collector member remover means whereat said dust collector member is removed from the glass sheet by tension applied to said dust collector member;

said adhesive coated dust collector member retaining entrapped dust particles between it and the glass sheet;

then past said protective sheet remover means whereat said protective sheet is removed from said laminate sheet by tension applied to the protective sheet, and then past said applicator roller whereat the adhesive coated plastic sheet is compressed on said glass sheet.

3. Means for applying an adhesive coated laminate sheet having a removable protective sheet to a glass sheet with entrapped dust particles therebetween at a low commercially acceptable level comprising, a roller conveyor for traveling a glass sheet in a plane,
a laminate sheet applicator roller above said conveyor,
a laminate supply roller adjacent said applying roller,
means for friction-slip braking said supply roller,
a protective sheet removing roller adjacent said applying roller,
a protective sheet take-up roller adjacent said removing roller,
a friction-slip drive turning said take-up roller to take up the protective sheet as it is removed;

said conveyor and said applicator roller being spaced to press-engage a glass sheet therebetween whereby a glass sheet passing in pressed engagement between said roller conveyor and said applying roller effects reeling of the laminate sheet from said supply roller past said removing roller where the protective sheet is removed under tension from said storage roller with the adhesive coated laminate sheet passing around the applying roller where it is adhered to the glass sheet; and an adhesive coated member above said conveyor ahead of said removing roller;

said conveyor and said adhesive coated member being spaced to press-engage a glass sheet therebetween whereby dust particles on a glass sheet traveling in pressed engagement between said adhesive coated member and said conveyor are removed from the glass sheet by adherence to said adhesive coated member just prior to the application of the adhesive coated laminate sheet to the glass sheet.

References Cited

UNITED STATES PATENTS

| | | | |
|---|---|---|---|
| 3,574,030 | 4/1971 | Callander et al. | 156—99 |
| 3,616,839 | 11/1971 | Burrin et al. | 156—99 |
| 3,518,152 | 6/1970 | Storti | 156—249 |
| 3,158,887 | 12/1964 | Kanbar et al. | 15—104 A |
| 3,373,457 | 3/1968 | Rouch, Jr. | 15—104 A |
| 2,755,494 | 7/1956 | Bredin | 15—99 |

DANIEL J. FRITSCH, Primary Examiner

U.S. Cl. X.R.

15—104 A; 156—249, 344, 540, 543, 555; 161—406